US006182728B1

(12) United States Patent
Williams et al.

(10) Patent No.: US 6,182,728 B1
(45) Date of Patent: Feb. 6, 2001

(54) PNEUMATIC RUN FLAT TIRE

(75) Inventors: Thomas A. Williams, North Canton, OH (US); Jong Bok Park, Taejon (KR); Gary Day, Hudson, OH (US)

(73) Assignee: Hankook Tire, Uniontown, OH (US)

( * ) Notice: Under 35 U.S.C. 154(b), the term of this patent shall be extended for 0 days.

(21) Appl. No.: 09/326,347

(22) Filed: Jun. 4, 1999

(51) Int. Cl.$^7$ .............................. B60C 15/00; B60C 17/00
(52) U.S. Cl. ......................... 152/517; 152/550; 152/553
(58) Field of Search ................................... 152/517, 550, 152/553

(56) References Cited

U.S. PATENT DOCUMENTS

| | | |
|---|---|---|
| 3,840,060 | 10/1974 | Tangorra . |
| 3,954,131 | 5/1976 | Hoshino et al. . |
| 3,983,919 | 10/1976 | Messerly . |
| 3,994,329 | 11/1976 | Masson et al. . |
| 4,137,960 | 2/1979 | Cataldo . |
| 4,142,567 | 3/1979 | Johannsen et al. . |
| 4,193,437 | 3/1980 | Powell . |
| 4,261,405 | 4/1981 | Yamauchi et al. . |
| 4,287,924 | 9/1981 | Deck et al. . |
| 4,334,565 | 6/1982 | Stokes . |
| 4,365,659 | 12/1982 | Yoshida et al. . |
| 4,461,333 | 7/1984 | Filliol et al. . |
| 4,953,291 | 9/1990 | Markow . |
| 5,131,445 | 7/1992 | Tokieda et al. . |
| 5,217,549 | 6/1993 | Johnson . |
| 5,295,526 | 3/1994 | Tokieda et al. . |
| 5,299,615 | 4/1994 | Ataka . |
| 5,309,970 | 5/1994 | Kawabata et al. . |
| 5,368,082 | 11/1994 | Oare et al. . |
| 5,413,160 | 5/1995 | Giuliano . |
| 5,427,166 | 6/1995 | Willard, Jr. . |
| 5,494,091 | 2/1996 | Freeman et al. . |
| 5,505,241 | 4/1996 | Oks . |
| 5,511,599 | 4/1996 | Willard, Jr. . |
| 5,526,862 | 6/1996 | Ghilardi . |
| 5,639,320 | 6/1997 | Oare et al. . |
| 5,685,927 | 11/1997 | Hammond et al. . |
| 5,769,980 | 6/1998 | Spragg et al. . |
| 5,795,416 | 8/1998 | Willard, Jr. et al. . |

Primary Examiner—Adrienne C. Johnstone
(74) Attorney, Agent, or Firm—Hudak & Shunk Co., L.P.A.; Daniel J. Hudak

(57) ABSTRACT

A run flat tire has a plurality of reinforcing wedges located in the tire sidewall with the hardness of each wedge generally diminishing in the radially inward direction of the sidewall. Since the bead filler is harder than the radial innermost wedge, the hardness at generally the top of the bead filler increases in the radial inward direction. The reinforcing wedges partially overlap each other and can generally have any configuration. The changing of hardness of the radial wedges results in a wedge sequence and thus a more even strain distribution throughout the tire sidewall. This strain distribution extends the run flat life of the tire and also provides a good balance with other tire performance parameters.

12 Claims, 4 Drawing Sheets

PNEUMATIC RUN FLAT TIRE

FIELD OF THE INVENTION

The invention relates to a run flat pneumatic tire utilizing reinforcing wedges of different hardness in the tire sidewall.

BACKGROUND ART

The basic concept of run flat tires has been around for many years. Many of the early inventions, such as U.S. Pat. No. 4,130,154 (1978) used separate support members that were applied to the wheel rim. These support members provided a secondary device to support the tire in an uninflated condition. Advancements in rubber compounding technology, as well as tire building techniques, have made it possible to incorporate the uninflated support capabilities into the tire sidewall itself. This provides for a more practical solution to the run flat engineering problem due to a reduction in complexity. One of the early patents that utilized this approach was U.S. Pat. No. 4,193,437 (1980). This concept used an insert of rubber material in the tire sidewall that provided the necessary extra support to allow the tire to run without inflation. Many patents have since been issued to various companies that are all modifications of this same basic approach. Some examples include U.S. Patents:

- U.S. Pat. No. 4,405,007 (1983) U.S. Pat. No. 5,368,082 (1994), and U.S. Pat. No. 5,639,320 (1997) to Goodyear,
- U.S. Pat. No. 5,427,166 (1995), U.S. Pat. No. 5,511,599 (1996), and U.S. Pat. No. 5,868,190 (1999) to Michelin,
- U.S. Pat. No. 4,779,658 (1988), U.S. Pat. No. 4,917,164 (1990), U.S. Pat. No. 5,217,549 (1993), U.S. Pat. No. 5,427,176 (1995), and U.S. Pat. No. 5,529,105 (1996) to Firestone.

These patents generally use different construction and compound techniques to reach the goal of good run flat performance. However, one feature they all have in common is that they use sidewall inserts that essentially extend substantially the full radial sidewall length. This approach places a very difficult set of engineering requirements on one piece of material. Such material must provide adequate support and heat resistance performance for the entire sidewall height. Different zones in the sidewall have different performance characteristics. The upper sidewall region for instance is subjected to high flex and heat resistance requirements in the uninflated state. The lower sidewall zone, however, is subjected to much less stress. Moreover, the use of inserts that extend the full width of the sidewall makes it very difficult to balance tire performance characteristics.

A different concept is used in U.S. Pat. No. 5,309,970 (1994) which utilizes 3 specific sidewall zones. A relatively wide first reinforcing rubber insert transitions to a narrower second reinforcing insert which then transitions to the bead filler.

The characteristics of the above concepts are different from the proposed invention. Such concepts use the softest rubber compound in the upper sidewall region. The next hardest compound is the second reinforcing insert with the bead filler being the hardest compound. This approach has concentrated the stress on the upper first reinforcing insert instead of distributing it throughout the sidewall.

Another concept is set forth in U.S. Pat. No. 5,439,041 (1995) wherein the sidewall contains 3 basic zones. The upper zone in this case does not have any reinforcing insert. The middle section of the sidewall is reinforced with a "elastomeric sponge" type insert with the lower third consisting of a sandwich of this sponge and the bead filler. This concept also concentrates stresses in the upper sidewall region of the tire.

A final concept is set forth in U.S. Pat. No. 5,526,862 (1996) wherein reinforcement does not extend the full length of the sidewall. The inserts are graduated in hardness laterally across the sidewall cross section. The hardest insert is placed in the inner portion of the tire sidewall and makes up a small percentage of the total sidewall height. It is designed for the tire to collapse around this insert in the uninflated state. This concentrates stress in the mid sidewall region of the tire.

SUMMARY OF INVENTION

The present invention relates to a pneumatic run flat tire, which has a sidewall hardness profile or gradient, which generally, gradually decreases in a radial inward direction from the crown of the tire to the lower sidewall region. The gradient is obtained by utilizing a plurality of reinforcing wedges of different hardness, with the hardest wedge located in the radially outermost position. The hardness of the various wedges can be controlled by utilizing different compounding formulations. The shape, geometry, etc. of the wedges is such that generally a gradual change in hardness is obtained in going in either a radial inward or outward direction from a point defined by the thickest section width of the lower sidewall wedge. The result is a a more even stress distribution which allows for increased run flat performance while at the same time providing better tuning capabilities for other tire performance characteristics such as vehicle ride.

BRIEF DESCRIPTION OF THE DRAWINGS

The preferred embodiment of the invention, illustrative of the best mode which applicants have contemplated, is set forth in the following description and is shown in the drawings and is particularly and distinctly pointed out and set forth in the appended claims.

DEFINITIONS

"Upper Sidewall Wedge," hereafter referred to as USW, is the reinforcing insert which is applied closest to the edge of the steel belts. The USW is the hardest of the reinforcement wedges and has the lowest compression. This is item 30 in FIG. 2.

"Middle Sidewall Wedge," hereafter referred to as MSW, is the reinforcing insert which is applied at approximately the tire's maximum section width, between the USW and the Lower Sidewall Wedge. The MSW has hardness and compression properties that are approximately the average of the USW and the Lower Sidewall Wedge. These properties are similar to the properties of the Bead Filler. This is item 40 in FIG. 2.

Figure 1:
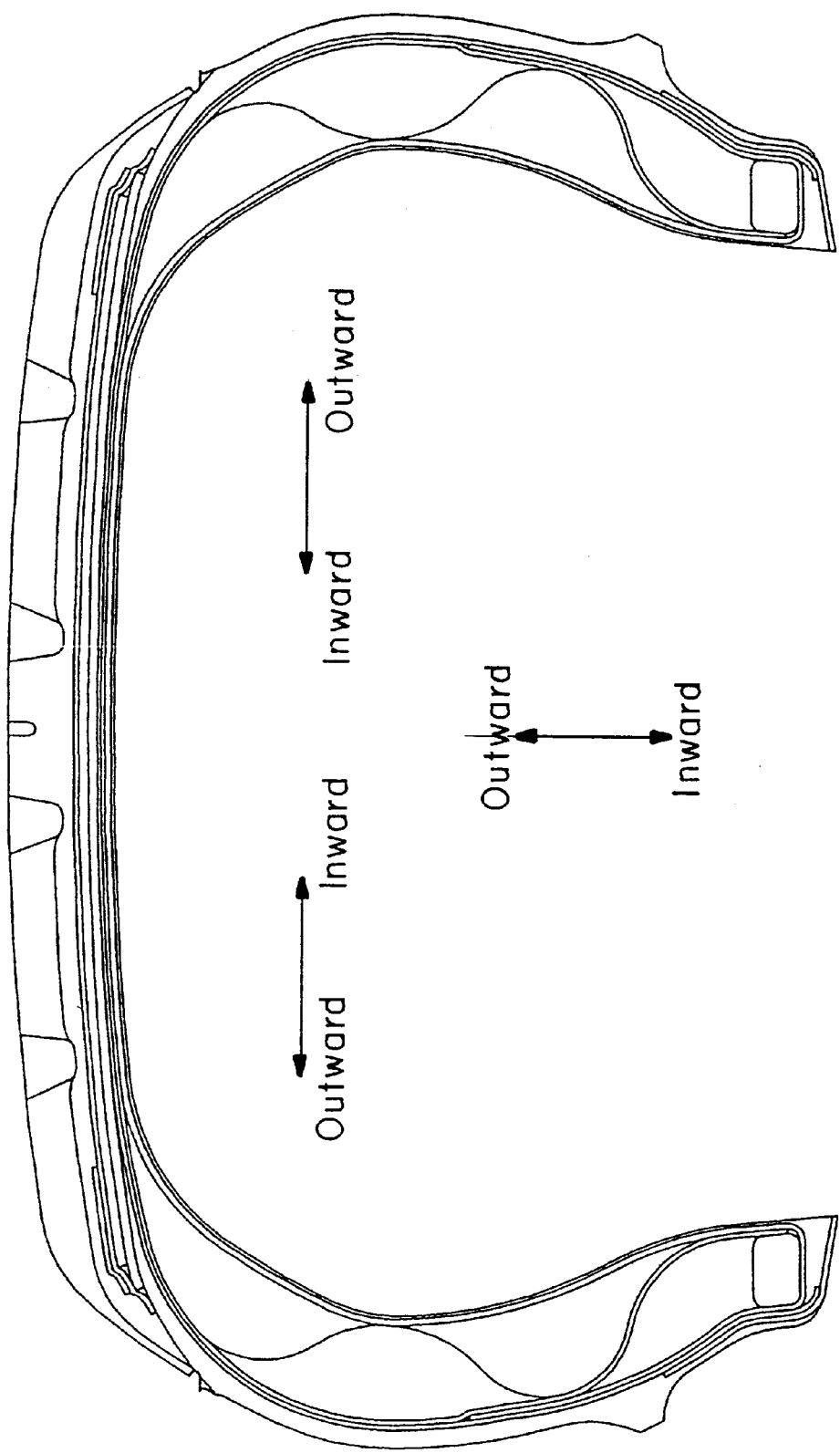
FIG. 1 is a transverse-sectional view of a tire primarily diagrammatic, and containing arrows indicating the lateral and radial directions utilized herein.

"Lower Sidewall Wedge," hereafter referred to as LSW, is the reinforcing insert which is applied directly above the bead filler in a radial outward direction as shown in FIG. 1. The LSW is the softest of the three reinforcement inserts with the highest compression. This is item 50 in FIG. 2.

"Bead Filler" refers to the material that is added directly above (i.e., radially outward) the bead of the tire. This is item 28 in FIG. 2.

Figure 2:
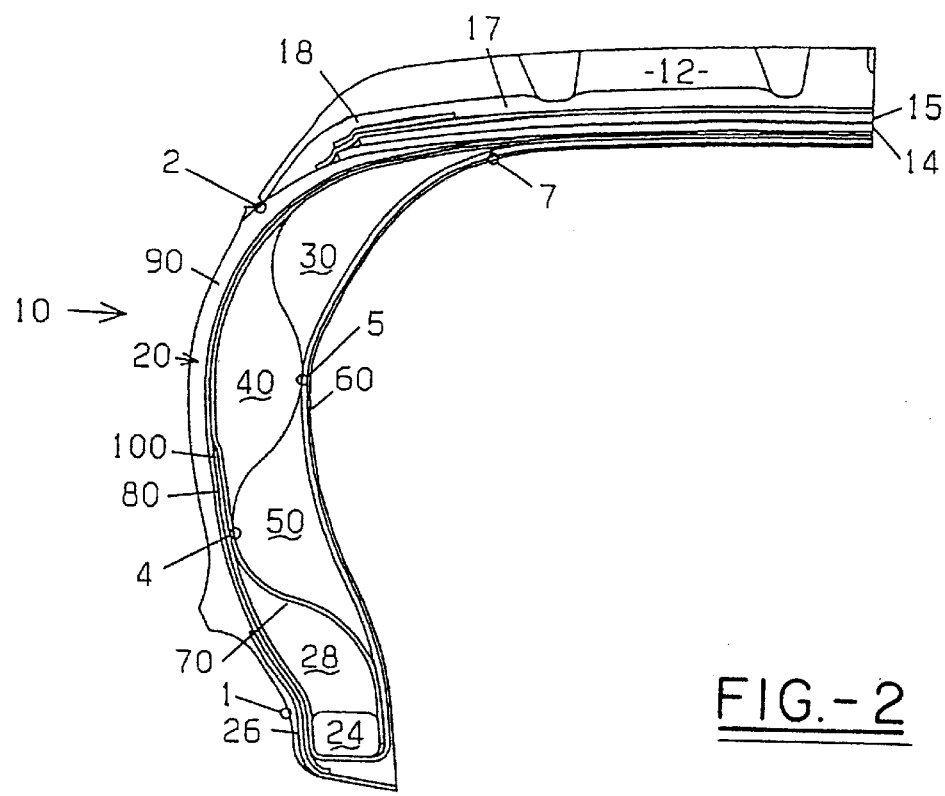
FIG. 2 is a transverse-sectional elevation view of a partial portion of a tire, primarily diagrammatic, showing a plurality of reinforcing wedges, preferably three, and plies in the tire sidewall.

"Bead," item 24 in FIG. 2, is an annular ring of tensile reinforcement material, such as steel, which provides retention of the tire to the rim.

"Chafer," item 26 in FIG. 2, is a narrow strip of material placed on the outside of the bead to protect this area from damage caused tire flexing on the rim.

"Body Ply," items 60, 70 & 80 in FIG. 2, is a composite material made up of rubber and parallel fabric cords. The fabric cords can be made up of various materials including polyester, aramid and rayon. Rayon is the preferred material for this patent.

"Belt," items 14 & 15 in FIG. 2, is a composite of rubber and reinforcing cords, typically made of steel, that are applied in the crown of the tire to improve handling and durability characteristics of the tire. These belts typically are applied in pairs and are applied with opposing bias angles under the tread of the tire.

"Full Cap," item 17 in FIG. 2, is a composite of rubber and reinforcing cords, usually made of nylon, that is applied in the crown region of the tire running the entire width of the tread, to improve durability and high speed performance of the tire. "Cap Strip," item 18 in FIG. 2, is a composite of rubber and reinforcing cords, usually made of nylon, that is applied in the crown region of the tire with a narrow width applied only in the shoulder region of the tire tread. It's purpose is again to improve the durability and high speed performance of the tire.

"Sidewall," item 20 in FIG. 2, refers to item 20 and means the portion of the tire construction between the bead and the tread region. It is made up of many different components including bead filler, body plies and reinforcement inserts.

"Sidewall Rubber," item 90, is the actual sidewall rubber of the tire. This is a thin veneer of rubber that is applied over the last body ply. This rubber protects the tire construction from weathering and abrasions. It also provides the rubber material that is molded into decorative designs as well as information about the tire such as size and design.

DETAILED DESCRIPTION OF THE INVENTION

The run flat tire of the present invention can typically be any pneumatic tire and is generally indicated by the numeral 10. The tire has a tread or cap tread 12, which can be made from one or more conventional rubbers known to the art and the literature. A further description of the compounding required for the reinforcing inserts is, however, set forth herein below for clarity. Run flat tire 10 can have one or more reinforcing belts such as first steel belt 14 and second steel belt 15. Moreover, the tire tread area can also contain an edge cover layer, or cap strip 18 made of nylon as well as full cap layer 17 made of nylon. These reinforcement layers provide extra stiffness to the tread region of the tire to help reduce bending in the uninflated state and improve durability in the inflated state. The tire has a sidewall area generally indicated by the number 20 that extends radially inward from the outer edge of the tread.

Referring to FIG. 1, the geometric coordinates of the tire are set forth with the lateral direction extending in a horizontal direction of the drawing and the radial direction extending in a vertical direction of the drawing.

Referring to FIG. 2, the radial innermost portion of the tire contains tire bead 24 having a chafer strip 26 extending from the tire bead into the sidewall area, and filler portion 28 extending radially outward into the sidewall area. The general purpose of the bead filler is to provide a smooth transition from the bead to the sidewall above the bead. The more specific purpose of the bead filler for the run flat tire of the present invention is to provide a zone of materials whose properties are similar to the properties of the MSW, item 40. This causes the primary flex point to be located in the LSW material, item 50.

According to the concepts of the present invention, a plurality of sidewall reinforcing wedges are utilized, each having a different hardness or stiffness, as well as different compressive characteristics, and generally located in a different radial location in the sidewall with respect to one another. While the total number of reinforcing wedges utilized in the preferred embodiment is three, the number thereof can vary as from about 2 to about 5. Application of a different number of wedges is dependent on the size tire, and therefore the total sidewall length. The radial length of each wedge is less than the radial length of the tire sidewall, which is generally defined by the distance from the top of the bead, point 1, to the edge of the tread, point 2, in FIGS. 2–5. Typically, each wedge can have a total length of from about 15% to about 85% and desirably from about 35% to about 65%, of the tire sidewall radial length as defined above. While each wedge can be located radially above or below an adjacent wedge, desirably, they partially overlap one another.

Point 4 noted on FIG. 2 designates a transition point in sidewall stiffness. This point can be located in a range of from about 10% to about 60% and desirably from about 25% to about 45% of the total sidewall length in a radial outward position from the top of the bead. This point also generally corresponds to the maximum thickness point for the LSW.

The reinforcing wedges desirably have a configuration such that the hardness or stiffness of the sidewall going from the radial outermost portion (Point 2) of the sidewall to Point 4, see FIG. 2, generally, gradually decreases in hardness or has a decreasing hardness or stiffness gradient. This gradient then increases from Point 4 as the direction continues radially inward (as defined by FIG. 2). In other words, a smooth, gradual change occurs which results in a gradual transition of the material properties, such as hardness or stiffness. Various shapes can be utilized such as a parallelogram, a rhomboid, a trapezoid, a shape in which one side is undulating and the other side is essentially a straight line, etc., with a preferred shape being a sinusoidal shape such as shown in the drawings. Other shapes can, of course, be used to generate the same sidewall properties.

According to a preferred embodiment of the present invention, three different wedges of different hardness are utilized as shown in FIGS. 2 through 5 in conjunction with the bead filler. The USW 30 has the highest stiffness or Shore A hardness of from about 75 to about 86 and desirably from about 77 to about 84, the MSW has a Shore A hardness of from about 73 to about 82 and desirably from about 75 to about 80, and the Shore A hardness of the LSW is from about 63 to about 77 and desirably from about 65 to about 75. Depending upon the size of the tire, the lateral thickness of the tire and the like, other values can utilized with a general proviso, as noted above, that the hardness or stiffness generally, gradually decreases from the radial outward direction towards the radial inward direction. Moreover, the hardness or stiffness of the LSW is desirably less than the hardness or stiffness of the bead filler 28, which desirably has approximately the same hardness or stiffness as MSW 40. When a run flat tire having a sidewall reinforcing wedge embodiment as shown in FIGS. 2 through 5 is utilized, LSW 50 is positioned so that it's thickest lateral cross section is located at a point of from about 10% to about 60%, desirably from about 25% to about 45%, preferably from about 30 to about 40% of the total tire sidewall length above the tire bead. Accordingly, the radially inward length within the LSW are the lengths of bead filler 28. Considering the MSW, the maximum lateral cross section thereof occurs approximately at the maximum lateral width of the tire. That is, at a point which is generally from about 30 to about 85%, desirably from about 45 to about 70%, and preferably from about 53 to about 63% of the total tire sidewall length above the tire bead. The USW maximum lateral cross section thickness occurs at approximately at the edge of the tread, point 2 on FIG. 2. That is, at a point which is generally from about 75 to about 125%, desirably from about 85 to about 115% and preferably from about 95 to about 105% of the tire sidewall length above the tire bead. Percentages above 100% are utilized to denote the radially outward location (Point 7) which is above point 2 in FIGS. 2–5 and wherein the USW is located partially beneath steel belts 14 and 15.

The total sidewall thickness, i.e., from the most laterally inward surface of the innerliner to the most lateral outward surfaces of sidewall 90, is a tuning parameter used to adjust the tire performance characteristics. The total thickness used is dependent on the loading demands coupled with the material properties of the inserts. This combination provides extensive latitude in design capabilities of the present invention. Moreover, the teachings of the present invention can be applied to tires not intended for run flat usage. For example, thinner sidewall thickness can be used to provide ways to tune tires for handling, ride or road noise characteristics. The actual lateral thickness of the wedges will vary, as noted above, with regard to the tire size, the tire sidewall radial length, and the like, but generally is from about 10 to about 30 mm and desirably from about 16 to about 24 mm.

FIGS. 2 through 5 show various body ply configurations. Each configuration provides a different set of performance tradeoffs, which can be used, dependent on the individual tire's application. All of these configurations use the same reinforcement insert configuration. However, other configurations as well as other numbers of wedges can be utilized. Furthermore, the composition of the inserts can be changed to provide for specific performance characteristics. The total sidewall thickness used in each ply configuration can also be different.

FIG. 2 shows a tire having a total of 3 body plies. The following is a general description with respect to a tire building process to clarify the relative positions of the individual components of the present invention. The first tire component applied to a building drum is the innerliner of the tire with the body ply 60 applied above the innerliner. The inserts (30, 40 & 50) are next applied to the top of the first body ply with LSW located in the most laterally outward positions. The second body ply 70 is then applied over the reinforcing inserts. The bead 24 and bead filler 28, which are pre-assembled, are next applied to the construction. Turnup 100 is then applied. Third body ply 80 is then applied on top of the existing components. Chafer 26 is applied next with sidewall runner 90 applied on the top of the above-noted sidewall construction. The final step is to apply the tread package, comprising belts 14 and 15, full cap 12 and cap strips 17 and 18, and tread 12. This construction package provides a good performance compromise with respect to good vertical stiffness in the uninflated condition because of the two outside plies. The combination of plies on both sides of the reinforcing inserts also provides good lateral stiffness to the construction when uninflated.

Figure 3:
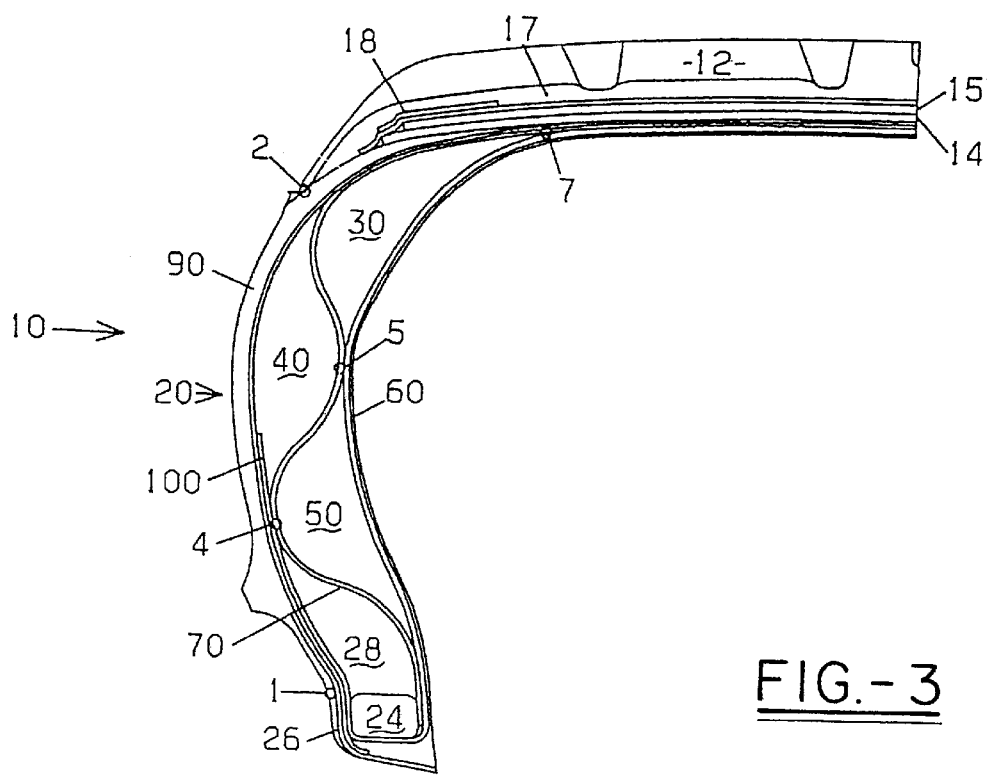
FIG. 3 is a transverse-sectional view similar to FIG. 2, primarily diagrammatic, having an intermediate ply of a three-sidewall ply construction is located between the junctions of the reinforcing wedges.

FIG. 3 shows a second tire construction having a total of 3 body plies. The basic order of building is the same for this tire as FIG. 2 but with one exception. The second body ply 70 is applied on top of reinforcing inserts 30 (LSW) & 50 (USW). Reinforcing insert 40 (MSW) is then applied on top of the second body ply. The rest of the construction order is generally the same. This sidewall ply configuration provides improvements in lateral stiffness but sacrifices vertical stiffness when compared to the construction of FIG. 2.

Figure 4:
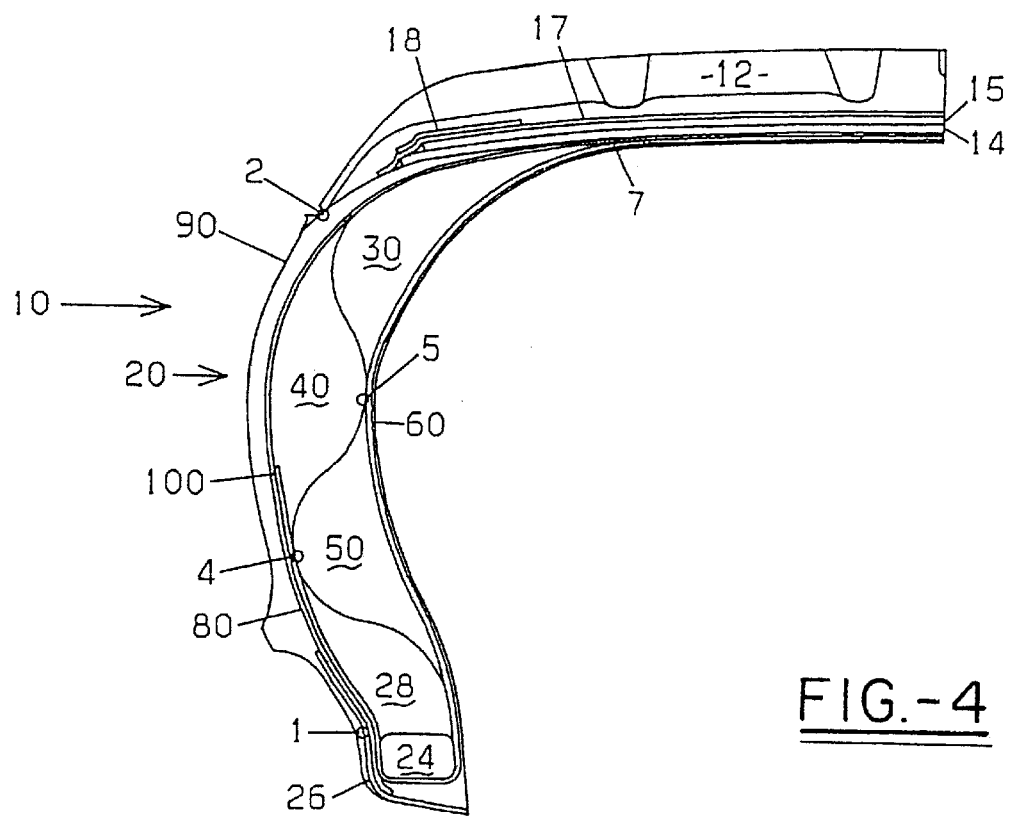
FIG. 4 is a transverse-sectional view similar to FIGS. 2 & 3, primarily diagrammatic, showing two sidewall plies encapsulate the reinforcing wedges.

FIG. 4 shows a two-ply construction. This construction is built the same as the construction shown in FIG. 2 with the exception of body ply 70 is eliminated. This sidewall ply configuration provides a tire with lower vertical stiffness while still maintaining a good lateral stiffness. It also provides a lightweight construction.

Figure 5:
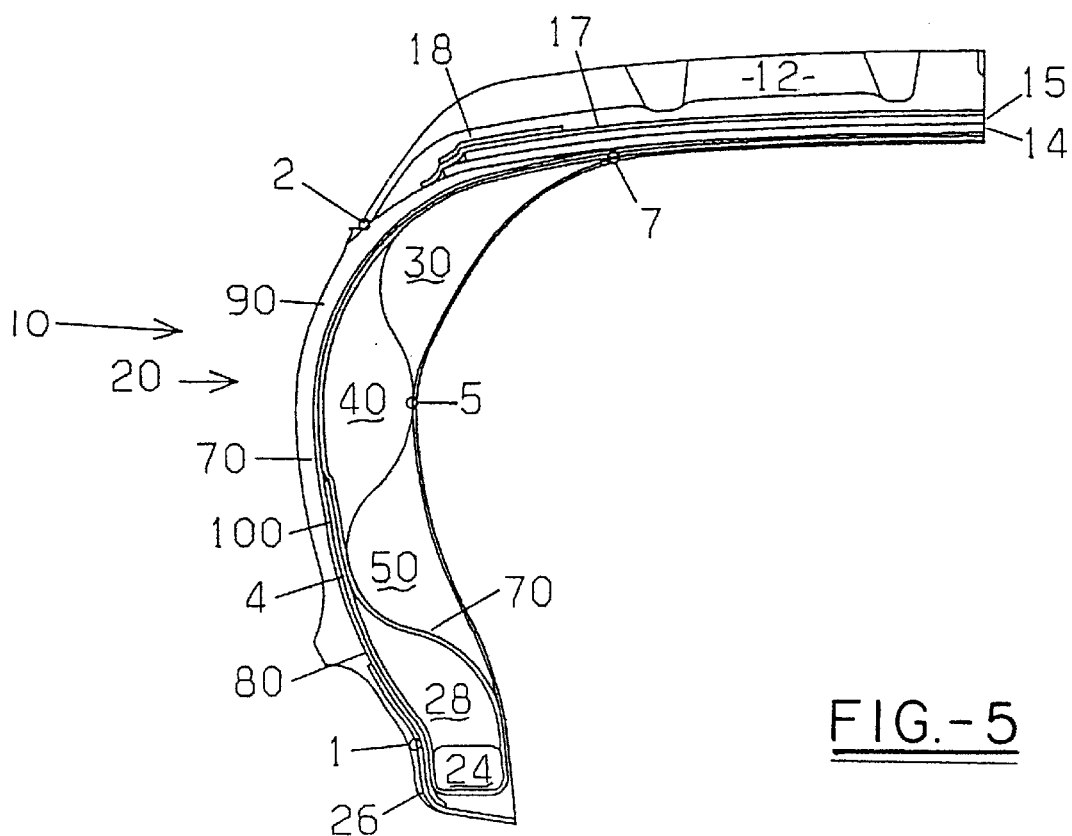
FIG. 5 is a transverse-sectional view similar to FIGS. 2, 3 & 4, primarily diagrammatic, showing two sidewall plies exist that run on the outside of the reinforcing wedges.

FIG. 5 shows another two-ply construction. This construction is again built as described in the construction depicted in FIG. 2. The exception in this embodiment is that body ply 60 is eliminated. The reinforcing wedges in this construction are applied directly to the innerliner. This construction provides good vertical stiffness but sacrifices lateral stiffness.

Figure 6:
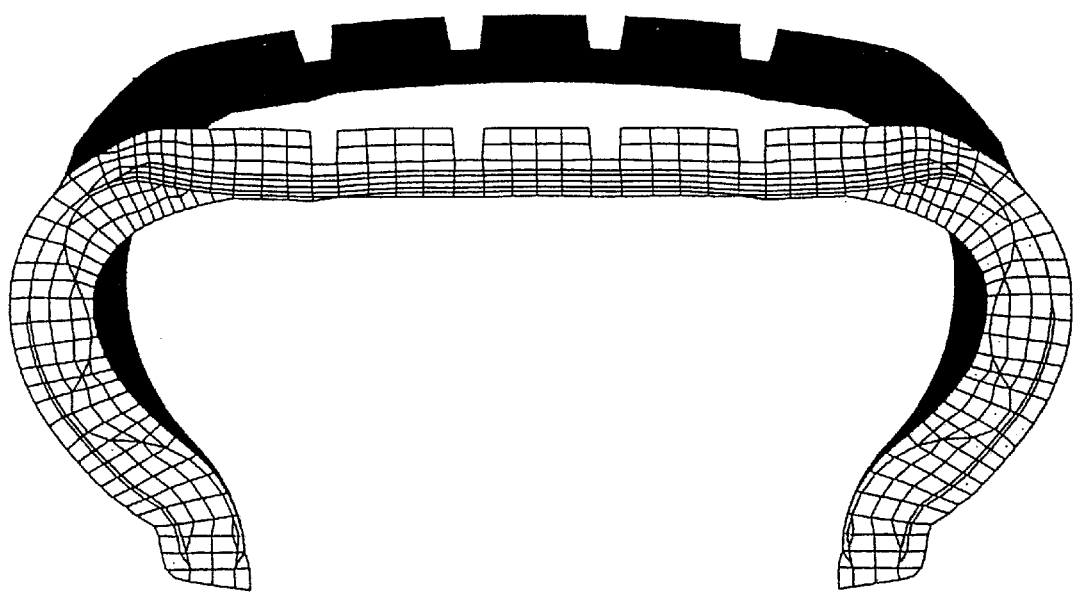
FIG. 6 is a finite element representation showing the benefits of the new invention with respect to an undeflected cross-section and a deflected cross section after the application of 900 lbs. load.
Figure 7:
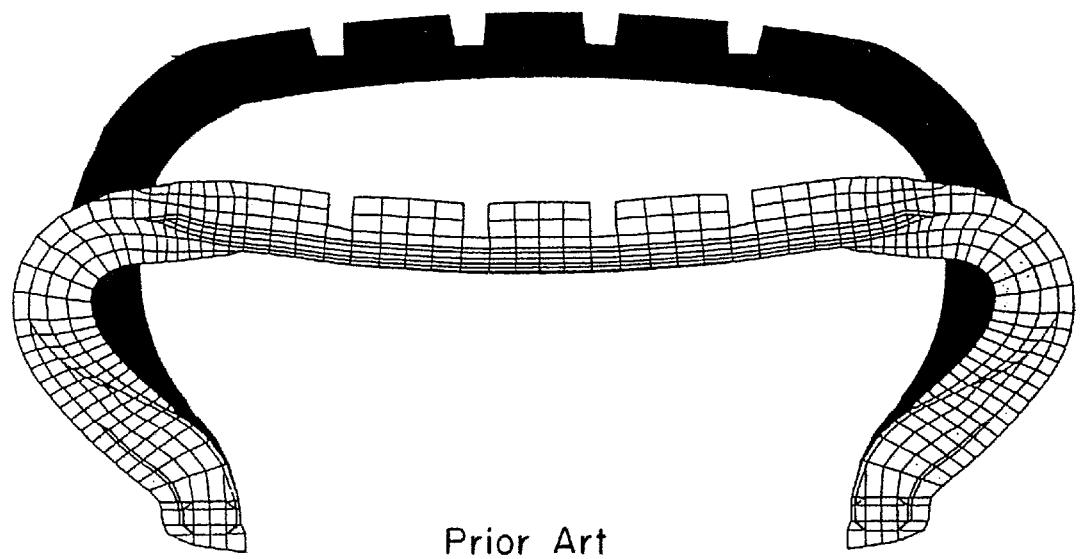
FIG. 7 is a finite element representation of a run flat prior art time according to U.S. Pat. No. 5,795,416 (1998).

FIGS. 6 and 7 show finite element representations of the current invention compared to the prior art. FIG. 6 shows the current invention modeled with material values assigned as described in this specification at a load of 900 lbs. and 0 psi inflation. FIG. 7 shows a tire from U.S. Pat. No. 5,795,416 (1998) that is subjected to the same conditions. Material properties for the modeling results shown in FIG. 7 were based on the description in the patent. This representation is therefore only as accurate of the actual product as estimates from the referenced patent can provide.

The rubber compositions of the sidewall inserts must exhibit the necessary requirements of stiffness and must also have low heat build-up. The stiffness of the rubber compositions can be characterized in laboratory testing by any of a number of tests that are known to those skilled in the art of rubber testing. Two acceptable procedures are the initial deflection when measured by a Goodrich flexometer according to ASTM D623 and the dynamic modulus when measured by a RPA2000® Rubber Processability Analyzer (RPA) available from Alpha Technologies. The RPA test relates to inserting a sample of the uncured rubber composition into the cavity of the RPA2000 analyzer and allowing the sample to cure in a static state for 12 minutes at an isothermal temperature of 168° C. The sample is then cooled to 55° C. where it tested in a strain sweep mode from 0.5% strain to 15% strain using 20 Hz testing frequency. The G' value at 5% can be used to compare the relative stiffness of the different rubber compositions used in this invention.

Excessive heat build-up of the rubber compositions is detrimental to the useful life of a tire. Heat build-up is a result of the internal hysteresis of the rubber compositions. The hysteresis or the heat build-up can be measured in the laboratory by any number of procedures known to those skilled in the art of rubber testing. One satisfactory procedure is to use a Goodrich flexometer while following the ASTM test number D623 for heat buildup. The machine measures the temperature build up with a thermocouple in contact with the surface of the test specimen. In addition to this measurement, a thermocouple probe can be inserted into the center of the rubber specimen immediately subsequent to the test conclusion and the sample's internal temperature can be recorded. A second satisfactory method is to measure the tangent delta while using the RPA2000 for heat buildup under the procedure mentioned previously.

One of the requirements of the present invention is that the stiffness of the sidewall inserts progressively increases from USW 50 to the MSW 40 and next to the LSW 30. The following table of selected physical properties displays the range of acceptable properties for the three inserts utilized in a P225/60R16 tire.

TABLE 1

|  | USW | MSW | LSW |
|---|---|---|---|
| Static deflection[1] | 0.04–0.11 | 0.06–0.15 | 0.08–0.17 |
| G'[2] (kPa) | 3000–7000 | 25000–5000 | 1000–3200 |
| Hardness (Shore A)[3] | 77–84 | 75–80 | 65–75 |
| Heat Buildup[1] (° C.) | <40 | <40 | <40 |
| Tangent Delta[2] | <0.200 | <0.190 | <0.180 |
| Modulus (50%)[4] Mpa | 3.0–7.0 | 2.5–6.0 | 2.0–5.0 |

[1]Goodrich Flexometer - ASTM number D623
[2]RPA2000 tested at 55° C., 5% strain and 20 Hz
[3]Shore A Hardness - ASTM number D2240
[4]Tension modulus - ASTM number D412

Table 1 shows overlaps in the modulus, the static deflection, the G' and the Shore A hardness between the USW and MSW components, and also between the MSW and the LSW components. This is acceptable as long as the USW is equal to or stiffer than the MSW, and the MSW is equal to or stiffer than the LSW. The actual stiffness and stiffness values can be adjusted to fit the specific requirements of a tire.

Because the mass of the inserts can be adjusted, and in some situations it may be desirable to increase the thickness of the inserts, it is important to minimize the hysteresis of the inserts. While the ranges listed above are suitable for most situations, a more desirable range for the 3 inserts would be <0.140 for the USW, <0.130 for the MSW and <0.120 for the LSW and preferable levels for tangent delta would be <0.100 for the USW, <0.090 for the MSW and <0.080 for the LSW.

Desirable rubber compositions having such desired physical properties are well known to those skilled in the art. The various components of the tire including the tread, cap layer, sidewall rubber, sidewall wedges, and the like, can be made from one or more conventional rubbers known to the art and to the literature such as natural rubber, synthetic cis-1,4-polyisoprene, one or more conjugated dienes having from 4 to 10 carbon atoms such as butadiene, polyisoprene, and the like, or blends of such one or more conjugated diene monomers or one or more vinyl substituted aromatic monomers having a total of from 8 to 12 carbon atoms such as styrene, α-methyl styrene, and the like. Conventional or known additives can be utilized in suitable amounts such as carbon black, curing aids such as sulfur, sulfur-containing compounds, accelerators, including amines, disulfides, guanidines, thioureas, thiazoles, thiurams, sulfenamides, diothiocarbamates, and the like. Other additives include silica, various oils such as aromatic, naphthenic, or paraffinic, various antioxidants, various antiozonates, various aliphatic acids such as stearic acid, zinc oxide, various waxes, various fillers such as clay, and the like.

A desired composition which can be utilized to achieve properties of the various wedges is set forth in Table 2 with the properties of the wedges of Table 2 being set forth in Table 3.

TABLE 2

| | (PARTS BY WEIGHT) | | |
|---|---|---|---|
| | USW | MSW | LSW |
| Natural Rubber | 40 | 40 | 80 |
| High Cis Polybutadiene | 60 | 60 | 20 |
| GPF Carbon Black | 25 | 65 | 65 |
| LS-HAF Carbon Black | 40 | 0 | 0 |
| Zinc Oxide | 5 | 5 | 5 |
| Stearic Acid | 1.5 | 1.5 | 1.5 |
| 6PPD[1] | 1.5 | 1.5 | 1.5 |
| Cashew Nut Shell Resin[2] | 3.5 | 2.5 | 0 |
| Sulfur | 9.4 | 9.4 | 5 |
| TBBS[3] | 1 | 1 | 1 |
| Hexamethylene Tetraamine[4] | 0.5 | 0.5 | 0.5 |

[1]Flexsys - (N-1,3 Dimethylbutyl-N'-phenyl-p-phenylenediamine
[2]Sumitomo
[3]Bayer - (N-t-butyl-2-benzothiazyl sulfenamide)
[4]Flexsys

TABLE 3

| | USW | MSW | LSW |
|---|---|---|---|
| G'(kPa) | 4378 | 4166 | 1980 |
| Deflection | 0.08 | 0.095 | 0.135 |
| Tangent Delta | 0.130 | 0.110 | 0.120 |
| Shore A Hardness | 79 | 78 | 66 |
| 50% Modulus (Mpa) | 42 | 48 | 23 |

In the foregoing description, certain terms have been used for brevity, clarity, and understanding; but no unnecessary limitations are to be implied therefrom beyond the requirements of the prior art, because such terms are used for descriptive purposes and are intended to be broadly construed.

A P225/60R16 tire having the composition of the specific wedges as set forth in Table 2 and the properties as set forth in Table 3 built in accordance with the construction of FIG. 2 was tested. The test involved running the tire 100 miles at 0 PSI at 55 MPH and resulted in no failure of the tire.

While in accordance with the Patent Statutes, the best mode and preferred embodiment have been set forth, the scope of the invention is not limited thereto, but rather by the scope of the attached claims.

What is claimed is:

1. A run flat tire, comprising;
   a plurality of sidewall reinforcing wedges in each sidewall, at least one said wedge partially overlapping an adjacent wedge in a radial direction, a radially outermost wedge having a higher Shore A hardness than all remaining wedges and a radially innermost wedge having a lower Shore A hardness than all other remaining wedges; and
   each of said plurality of wedges diminishing in hardness in a radially inward direction, wherein said tire further comprises a tire bead radially below each sidewall, wherein said radially outermost wedge has a maximum lateral thickness location of from about 75 percent to about 125 percent of the tire sidewall radial length above said tire bead, and wherein said radially innermost wedge has a maximum lateral thickness location of from about 10 percent to about 60 percent of the tire sidewall radial length above said tire bead.

2. A run flat tire according to claim 1, wherein said radially outermost wedge has a Shore A hardness of from about 75 to about 86, and wherein said radially innermost wedge has a Shore A hardness of from about 63 to about 77.

3. A run flat tire according to claim 2, wherein the number of wedges is 3, wherein the maximum lateral thickness location of said radially outermost wedge is from about 85 to about 115 percent, wherein the maximum lateral thickness location of said intermediate wedge is from about 45 to about 70 percent and wherein the maximum lateral thickness location of said radially innermost wedge is from about 25 percent to about 45 percent, each said maximum lateral thickness location based upon the tire sidewall radial length above said tire bead.

4. A run flat tire according to claim 3, wherein the tire further comprises three body plies, wherein said first body ply is located on the laterally inward side of said wedges, wherein said second body ply is located on the laterally outward side of said radially outermost wedge and said radially innermost wedge and on the laterally inward side of said intermediate wedge, and wherein said third body ply is located on the laterally outward side of said wedges.

5. A run flat tire according to claim 3, wherein the shape of the overlapping portion of each said wedge is substantially sinusoidal, wherein said radially outermost wedge has a Shore A hardness of from about 77 to about 84, wherein said intermediate wedge has a Shore A hardness of from about 75 to about 80, and wherein said radially innermost wedge has a Shore A hardness of from about 65 to about 75.

6. A run flat tire according to claim 5, wherein the tire further comprises three body plies, wherein said first body ply is located on the laterally inward side of said wedges, wherein said second body ply is located on the laterally outward side of said wedges, and wherein said third body ply is located on the laterally outward side of said wedges.

7. A run flat tire according to claim 5, wherein the tire further comprises three body plies, wherein said first body ply is located on the laterally inward side of said wedges, wherein said second body ply is located on the laterally outward side of said radially outermost wedge and said radially innermost wedge and on the laterally inward side of said intermediate wedge, and wherein said third body ply is located on the laterally outward side of said wedges.

8. A run flat tire according to claim 5, wherein the tire further comprises two body plies, wherein said first body ply is located on the laterally inward side of said wedges, and wherein said second body ply is located on the laterally outward side of said wedges.

9. A run flat tire according to claim 5, wherein the tire further comprises two body plies, wherein said first body ply is located on the laterally outward side of said wedges, and wherein said second body ply is located on the laterally outward side of said wedges.

10. A run flat tire according to claim 1, wherein the tire further comprises three body plies, wherein said first body ply is located on the laterally inward side of said wedges, wherein said second body ply is located on the laterally outward side of said wedges, and wherein said third body ply is located on the laterally outward side of said wedges.

11. A run flat tire according to claim 1, wherein the tire further comprises two body plies, wherein said first body ply is located on the laterally inward side of said wedges, and wherein said second body ply is located on the laterally outward side of said wedges.

12. A run flat tire according to claim 1, wherein the tire further comprises two body plies, wherein said first body ply is located on the laterally outward side of said wedges, and wherein said second body ply is located on the laterally outward side of said wedges.

\* \* \* \* \*